(12) United States Patent
Kim (10) Patent No.: US 9,091,760 B2
(45) Date of Patent: Jul. 28, 2015

(54) PERFORMING RECEIVE-FOCUSING BASED ON MID-POINT ALGORITHM IN ULTRASOUND SYSTEM

(75) Inventor: Beom Gyu Kim, Seoul (KR)

(73) Assignee: SAMSUNG MEDISON CO., LTD., Hongchun-Gun, Kangwon-Do (KR)

( * ) Notice: Subject to any disclaimer, the term of this patent is extended or adjusted under 35 U.S.C. 154(b) by 484 days.

(21) Appl. No.: 13/328,483

(22) Filed: Dec. 16, 2011

(65) Prior Publication Data

US 2012/0157848 A1 Jun. 21, 2012

(30) Foreign Application Priority Data

Dec. 16, 2010 (KR) ........................ 10-2010-0128985

(51) Int. Cl.
- A61B 8/00 (2006.01)
- G01S 15/89 (2006.01)
- G01S 7/52 (2006.01)
- G10K 11/34 (2006.01)

(52) U.S. Cl.
CPC ......... G01S 15/8979 (2013.01); G01S 7/52025 (2013.01); G01S 7/52085 (2013.01); G01S 15/8915 (2013.01); G10K 11/346 (2013.01)

(58) Field of Classification Search
USPC ......................................... 600/407, 437–472
See application file for complete search history.

(56) References Cited

U.S. PATENT DOCUMENTS

| | | | |
|---|---|---|---|
| 4,182,173 A * | 1/1980 | Papadofrangakis et al. | 73/861.27 |
| 5,458,129 A * | 10/1995 | Wheeler et al. | 600/454 |
| 5,669,384 A | 9/1997 | Park et al. | |
| 5,836,881 A * | 11/1998 | Bae | 600/447 |
| 5,961,462 A * | 10/1999 | Loupas et al. | 600/453 |
| 6,077,226 A * | 6/2000 | Washburn et al. | 600/443 |
| 6,213,947 B1 * | 4/2001 | Phillips | 600/443 |
| 6,258,031 B1 * | 7/2001 | Sunagawa et al. | 600/443 |
| 6,364,838 B1 * | 4/2002 | Freiburger et al. | 600/455 |
| 6,500,122 B1 * | 12/2002 | Washburn et al. | 600/443 |
| 6,733,454 B1 * | 5/2004 | Bakircioglu et al. | 600/453 |
| 6,770,034 B2 * | 8/2004 | Sunagawa et al. | 600/443 |
| 8,439,840 B1 * | 5/2013 | Duffy | 600/443 |

(Continued)

FOREIGN PATENT DOCUMENTS

JP 11-221217 A 8/1999

OTHER PUBLICATIONS

Korean Office Action issued in application No. 10-2010-0128985 issued on Jun. 14, 2012.
Lie et al., "A Compact FPGA Beamformer Architecture", 2005 WSEAS Int. Conf. on Dynamical Systems and Control, Venice, Italy, Nov. 2-4, 2005, pp. 463-466.

(Continued)

Primary Examiner — James Kish
(74) Attorney, Agent, or Firm — McDermott Will & Emery LLP (57) ABSTRACT

There are provided embodiments for changing initial values of a mid-point algorithm to calculate a constant delay value throughout depths based on a sample volume and performing a receive-focusing based on the constant delay value. In one embodiment, an ultrasound system comprises: an ultrasound data acquisition unit configured to calculate a constant delay value throughout depths based on a sample volume by using a mid-point algorithm, transmit ultrasound signals to a living body, receive ultrasound echo signals from the living body and form digital signals based on the ultrasound echo signals, the ultrasound data acquisition unit being further configured to apply the constant delay value to the digital signals to acquire ultrasound data corresponding to a high pulse rate frequency Doppler image of the sample volume.

4 Claims, 5 Drawing Sheets

(56) References Cited

U.S. PATENT DOCUMENTS

| | | | |
|---|---|---|---|
| 2002/0116141 A1* | 8/2002 | Mo et al. | 702/76 |
| 2003/0009101 A1* | 1/2003 | Sunagawa et al. | 600/437 |
| 2004/0102706 A1* | 5/2004 | Christopher et al. | 600/453 |
| 2005/0033174 A1* | 2/2005 | Moehring et al. | 600/453 |
| 2007/0282203 A1* | 12/2007 | Baba et al. | 600/453 |
| 2011/0178406 A1* | 7/2011 | Shuangshuang et al. | 600/453 |

OTHER PUBLICATIONS

Extended European Search Report issued in European Application No. 11193764.5 dated May 21, 2014.

David H. Evans et al., "4.2.2 Pulsed Wave Velocity Detecting Systems", Doppler Ultrasound, Physics, Instrumentation and Signal Processing, Second Edition published 2000, John Wiley & Sons, Ltd., XP055117874, ISBN: 978-0-47-197001-9, pp. 45-50.

* cited by examiner

PERFORMING RECEIVE-FOCUSING BASED ON MID-POINT ALGORITHM IN ULTRASOUND SYSTEM

CROSS-REFERENCE TO RELATED APPLICATIONS

The present application claims priority from Korean Patent Application No. 10-2010-0128985 filed on Dec. 16, 2010, the entire subject matter of which is incorporated herein by reference.

TECHNICAL FIELD

The present disclosure generally relates to ultrasound systems, and more particularly to performing receive-focusing based on a mid-point algorithm in an ultrasound system.

BACKGROUND

An ultrasound system has become an important and popular diagnostic tool since it has a wide range of applications. Specifically, due to its non-invasive and non-destructive nature, the ultrasound system has been extensively used in the medical profession. Modern high-performance ultrasound systems and techniques are commonly used to produce two or three-dimensional ultrasound images of internal features of a target object (e.g., human organs).

The ultrasound system may transmit ultrasound signals to a living body and receive ultrasound signals (i.e., ultrasound echo signals) from the living body by using an ultrasound probe. The ultrasound system may further perform various signal processing upon the ultrasound echo signals to form an ultrasound image.

The ultrasound system may perform a beam forming based on a mid-point algorithm corresponding to a focusing delay algorithm used to calculate a dynamic receive-focusing delay. The ultrasound system may further provide a Doppler image by using a pulse rate frequency higher than a generally usable pulse rate frequency to detect blood flow faster than the maximum detectable blood flow velocity at a deep depth of the living body. The Doppler image is a high pulse rate frequency Doppler image.

When the ultrasound signals are transmitted to the living body, the ultrasound echo signals are received from the living body and receive-focusing is performed upon the ultrasound echo signals based on the mid-point algorithm, a receive-focusing delay curve in a depth corresponding to a phantom sample volume is used due to a timing problem between a sample volume and the phantom sample volume. Accordingly, this presents a problem since an accurate receive-focusing delay curve corresponding to a reflecting position (i.e., depth) of the ultrasound echo signals is not applied and the sensitivity of Doppler signals is decreased.

SUMMARY

There are provided embodiments for changing initial values of a mid-point algorithm to calculate a constant delay value throughout depths based on a sample volume and performing receive-focusing based on the constant delay value.

In one embodiment, by way of non-limiting example, an ultrasound system comprises: an ultrasound data acquisition unit configured to calculate a constant delay value throughout depths based on a sample volume by using a mid-point algorithm, transmit ultrasound signals to a living body, receive ultrasound echo signals from the living body and form digital signals based on the ultrasound echo signals, the ultrasound data acquisition unit being further configured to apply the constant delay value to the digital signals to acquire ultrasound data corresponding to a high pulse rate frequency Doppler image of the sample volume.

In another embodiment, there is provided a method of performing a receive-focus based on a mid-point algorithm, comprising: a) calculating a constant delay value throughout depths based on a sample volume by using a mid-point algorithm; b) transmitting ultrasound signals to a living body and receiving ultrasound echo signals from the living body to form digital signals based on the ultrasound echo signals; and c) applying the constant delay value to the digital signals to acquire ultrasound data corresponding to a high pulse rate frequency Doppler image of the sample volume.

This summary is provided to introduce a selection of concepts in a simplified form that are further described below in the Detailed Description. This summary is not intended to identify key or essential features of the claimed subject matter, nor is it intended to be used in determining the scope of the claimed subject matter.

DETAILED DESCRIPTION

A detailed description may be provided with reference to the accompanying drawings. One of ordinary skill in the art may realize that the following description is illustrative only and is not in any way limiting. Other embodiments of the present invention may readily suggest themselves to such skilled persons having the benefit of this disclosure.

Figure 1:
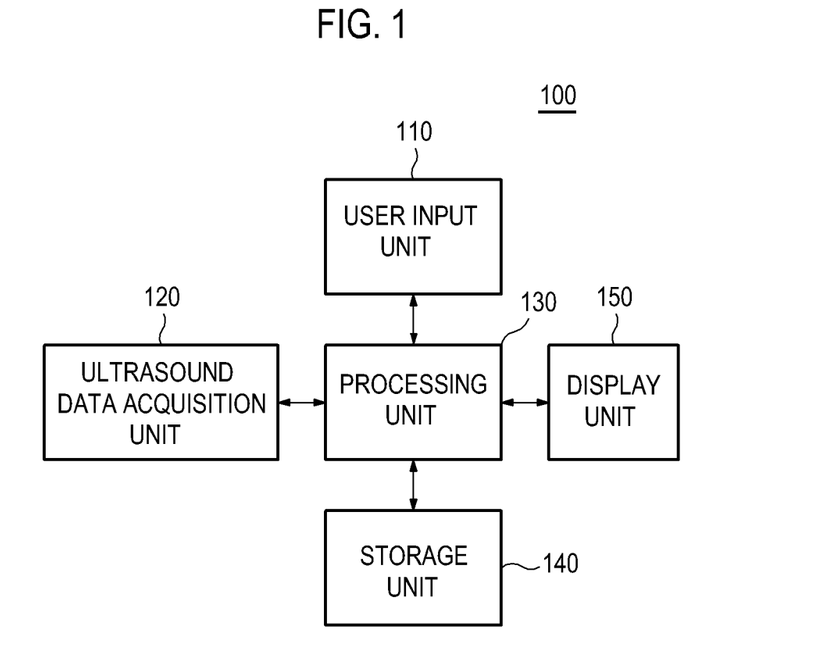
FIG. 1 is a block diagram showing an illustrative embodiment of an ultrasound system.

Referring to FIG. 1, an ultrasound system 100 in accordance with an illustrative embodiment is shown. As depicted therein, the ultrasound system 100 may include a user input unit 110.

Figure 2:
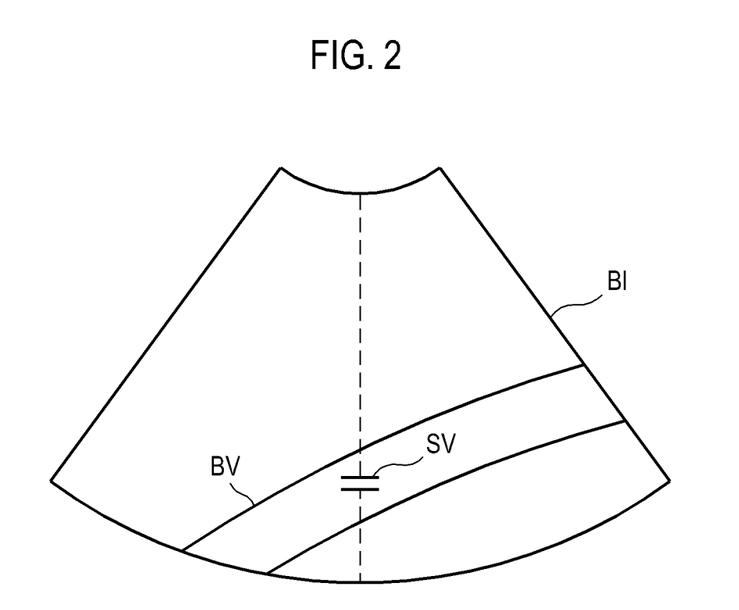
FIG. 2 is a schematic diagram showing an example of a brightness mode image and a sample volume.

The user input unit 110 may be configured to receive input information. In the embodiment, the input information may include first input information for setting a sample volume SV on a brightness mode image BI, as shown in FIG. 2. In FIG. 2, reference numeral BV represents a blood vessel. The input information may further include second input information for selecting a high pulse rate frequency Doppler mode. However, it should be noted herein that the input information may not be limited thereto. The user input unit 110 may include a control panel, a trackball, a mouse, a keyboard and the like.

The ultrasound system 100 may further include an ultrasound data acquisition unit 120. The ultrasound acquisition unit 120 may be configured to transmit ultrasound signals to a living body. The living body may include target objects (e.g., blood flow, a heart, etc.). The ultrasound acquisition unit 120 may be further configured to receive ultrasound signals (i.e., ultrasound echo signals) from the living body to acquire ultrasound data.

Figure 3:
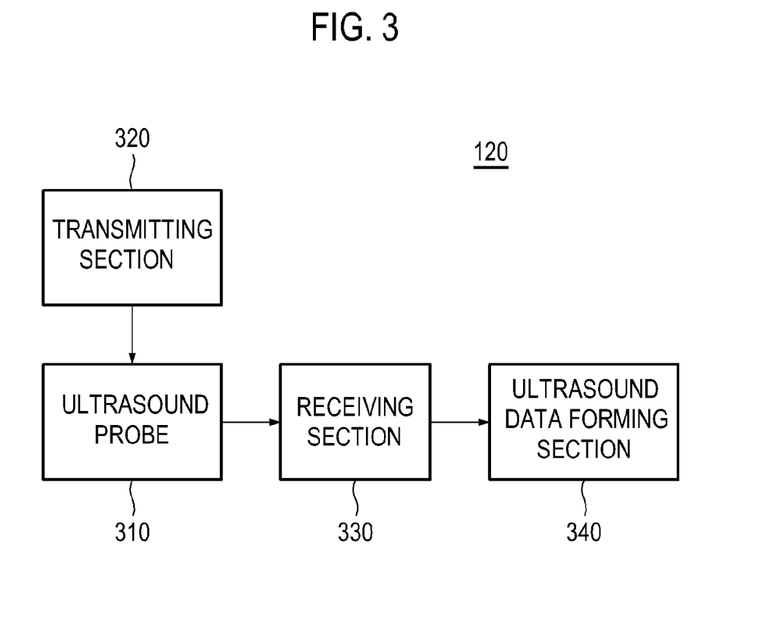
FIG. 3 is a block diagram showing an illustrative embodiment of an ultrasound data acquisition unit.

FIG. 3 is a block diagram showing an illustrative embodiment of the ultrasound data acquisition unit. Referring to FIG. 3, the ultrasound data acquisition unit 120 may include an ultrasound probe 310.

The ultrasound probe 310 may include a plurality of transducer elements (not shown) for reciprocally converting between ultrasound signals and electrical signals. The ultrasound probe 310 may be configured to transmit the ultrasound signals to the living body. The ultrasound probe 310 may be further configured to receive the ultrasound echo signals from the living body to output received signals. The received signals may be analog signals. The ultrasound probe 310 may include a convex probe, a linear probe and the like.

The ultrasound data acquisition unit 120 may further include a transmitting section 320. The transmitting section 320 may be configured to control the transmission of the ultrasound signals. The transmitting section 320 may be further configured to generate electrical signals ("transmitting signals") for obtaining an ultrasound image in consideration of the elements and focusing points. The transmitting section 320 may include a transmitting signal generating section (not shown), a transmitting delay time information memory (not shown), a transmitting beam former (not shown) and the like.

The ultrasound data acquisition unit 120 may further include a receiving section 330. The receiving section 330 may be configured to convert the received signals into digital signals. The receiving section 330 may be further configured to apply delays to the digital signals in consideration of the elements and the focusing points to thereby output digital receive-focused signals. The receiving section 330 may include an analog-to-digital converter (not shown), a receiving delay time information memory (not shown), a receiving beam former (not shown) and the like.

The ultrasound data acquisition unit 120 may further include an ultrasound data forming section 340. The ultrasound data forming section 340 may be configured to form ultrasound data corresponding to the ultrasound image based on the digital receive-focused signals provided from the receiving section 330. The ultrasound data may include radio frequency data or in-phase/quadrature data. However, it should be noted herein that the ultrasound data may not be limited thereto. The ultrasound data forming section 340 may be further configured to perform signal processing (e.g., gain control, etc) upon the digital receive-focused signals.

The ultrasound data acquisition unit 120 will be described with reference to the accompanying drawings. For convenience of explanation, it is assumed that the sample volume may be set at a depth of about 20 cm and a phantom sample volume corresponding to the sample volume may be set at a depth of about 10 cm (i.e., a half of the depth corresponding to the sample volume) in depth direction of the brightness mode image BI.

The transmitting section 320 may be configured to generate first transmitting signals for obtaining the brightness mode image BI in consideration of the elements and the focusing points.

The ultrasound probe 310 may be configured to convert the first transmitting signals into the ultrasound signals, transmit the ultrasound signals to the living body and receive the ultrasound echo signals from the living body to thereby form first received signals.

The receiving section 330 may be configured to convert the first received signals into first digital signals. The receiving section 330 may be configured to apply delays to the first digital signals based on a mid-point algorithm to thereby form first receive-focused signals.

Generally, the mid-point algorithm may be a focusing delay algorithm, which is used to calculate a dynamic receive-focusing delay. The mid-point algorithm may be defined as a conditional expression of equation 1 provided below.

$$\begin{aligned}
&\text{if } \quad d_n \le 0 \\
&\quad d_{n+1} = d_n + 8l_n + C_n \\
&\quad r_{n+1} = r_n + 1 \\
&\quad l_{n+1} = l_n \\
&\text{else } \quad d_n > 0 \\
&\quad d_{n+1} = d_n - 8r_n + C_P \\
&\quad r_{n+1} = r_n + 1 \\
&\quad l_{n+1} = l_n - 1
\end{aligned} \qquad (1)$$

Figure 4:
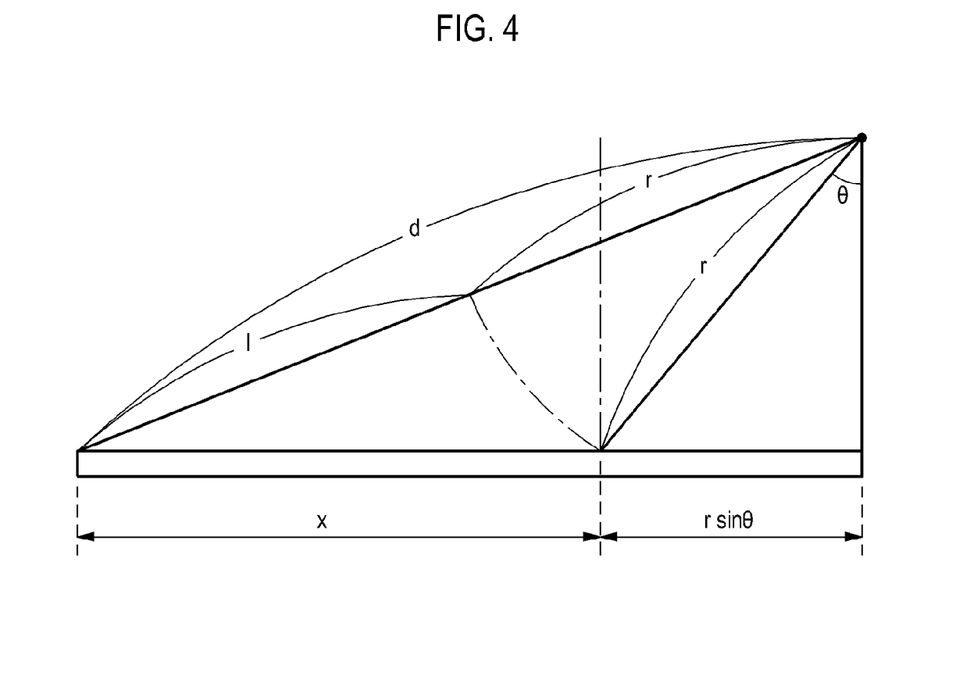
FIG. 4 is a schematic diagram showing an equation corresponding to a mid-point algorithm.

In equation 1, $d_n$ represents a decision function, $r_n$ represents an initial depth, and $l_n$ represents an initial delay value. That is, the $l_n$ represents a remaining distance obtained by subtracting the initial depth $r_n$ from the distance $d_n$. The distance $d_n$ represents a distance from the focusing point to the $N^{th}$ element. Also, $\alpha$ represents $2 \times \sin\theta$ shown in FIG. 4, $C_n$ represents $-4(\alpha+1)$, and $Cp$ represents $-12-4\alpha$.

The $C_n$ and $C_p$ of the mid-point algorithm may be determined by positions of the elements and the focusing points. Further, delay data of a receive-focusing delay curve may be generated by the $d_n$ and $r_n$ of the mid-point algorithm.

The ultrasound data forming section 340 may be configured to form first ultrasound data corresponding to the brightness mode image based on the first digital receive-focused signals provided from the receiving section 330. The first ultrasound data may include radio frequency data. However, it should be noted herein that the first ultrasound data may not be limited thereto.

The transmitting section 320 may be configured to generate second transmitting signals for obtaining a high pulse rate frequency Doppler image corresponding to the high pulse rate frequency Doppler mode based on the input information (i.e., first input information and second input information) and a pulse rate frequency. Thus, the ultrasound probe 310 may be configured to convert the second transmitting signals provided from the transmitting section 320 into the ultrasound signals, transmit the ultrasound signals to the living body and receive the ultrasound echo signals from the living body to form second received signals.

Figure 5:
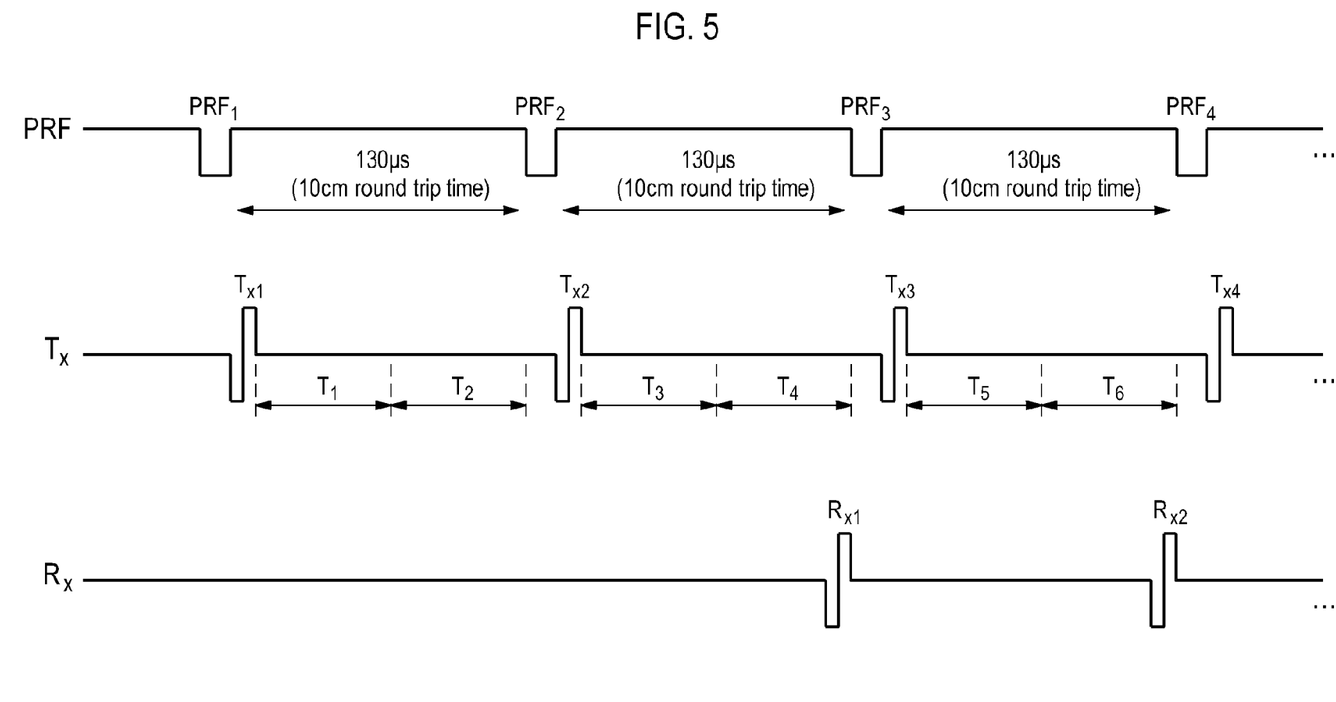
FIG. 5 is a timing diagram showing an example of a pulse rate frequency, transmission of ultrasound signals and reception of the ultrasound signals.
Figure 6:
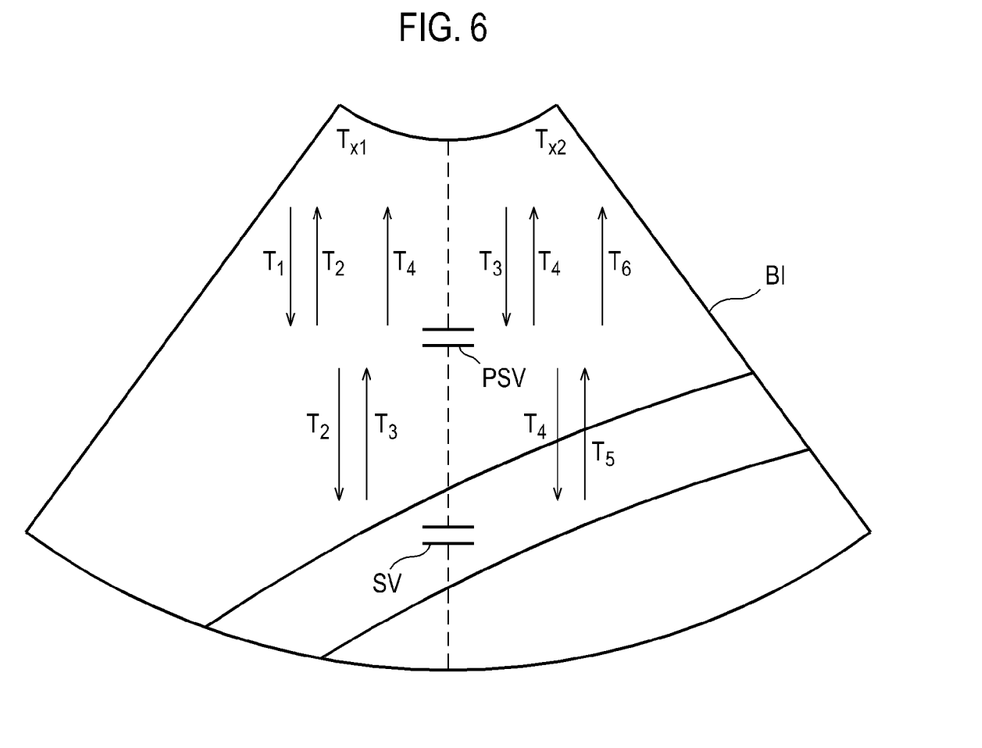
FIG. 6 is a schematic diagram showing an example of transmitting and receiving the ultrasound signals based on the pulse rate frequency.

For example, the transmitting section 320 may be configured to generate the second transmitting signals based on a first pulse rate frequency $PRF_1$. The ultrasound probe 310 may be configured to convert the second transmitting signals provided from the transmitting section 320 into the ultrasound signals and transmit the ultrasound signals ($Tx_1$) based on the first pulse rate frequency $PRF_1$, as shown in FIGS. 5 and 6. In FIG. 6, reference numeral PSV represents the phantom sample volume. After a $T_1$ time, the ultrasound signals transmitted from the ultrasound probe 310 may be reached to the depth of 10 cm, as shown in FIGS. 5 and 6. After a $T_2$ time, first ultrasound echo signals corresponding to the first pulse rate frequency $PRF_1$ may be received by the ultrasound probe 310, and the ultrasound signals corresponding to the first pulse rate frequency $PRF_1$ may be reached to the depth of 20 cm. The first ultrasound echo signals may be ultrasound signals reflected from the depth of 10 cm. Since the blood vessel does not exist at the depth of 10 cm, blood flow information (e.g., blood flow velocity and the like) corresponding to the first ultrasound echo signals may not exist.

The transmitting section 320 may be configured to generate the second transmitting signals based on second pulse rate frequency $PRF_2$. The ultrasound probe 310 may be configured to convert the second transmitting signals into the ultrasound signals and transmit ($Tx_2$) the ultrasound signals to the living body based on the second pulse rate frequency $PRF_2$. The ultrasound probe 310 may be further configured to receive ($Rx_1$) the ultrasound echo signals reflected from the living body to form the second received signals, as shown in FIGS. 5 and 6. That is, the ultrasound probe 310 may transmit ($Tx_2$) the ultrasound signals based on the second pulse rate frequency $PRF_2$, as shown in FIGS. 5 and 6. After a $T_3$ time, the ultrasound signals corresponding to the first pulse rate frequency $PRF_1$ may be reflected from the depth of 20 cm, and the ultrasound signals corresponding to the second pulse rate frequency $PRF_2$ may be reached to the depth of 10 cm. After a $T_4$ time, second ultrasound echo signals corresponding to the first pulse rate frequency $PRF_1$ may be received by the ultrasound probe 310, while third ultrasound echo signals corresponding to the second pulse rate frequency $PRF_2$ may be received by the ultrasound probe 310. The second ultrasound echo signals may be ultrasound echo signals reflected from the depth of 20 cm. The third ultrasound echo signals may be ultrasound echo signals reflected from the depth of 10 cm.

The transmitting section 310 may be configured to generate the second transmitting signals based on third pulse rate frequency $PRF_3$. The ultrasound probe 310 may be configured to convert the second transmitting signals provided from the transmitting section 310 into the ultrasound signals and transmit ($Tx_3$) the ultrasound signals to the living body, as shown in FIGS. 5 and 6. The ultrasound probe 310 may be further configured to receive ($Rx_2$) the ultrasound echo signals from the living body as shown in FIGS. 5 and 6 to thereby form second received signals. Referring to FIGS. 5 and 6, after a $T_5$ time, the ultrasound signals corresponding to the second pulse rate frequency $PRF_2$ may be reflected from the depth of 20 cm and may be reached to the depth of 10 cm. After a $T_6$ time, fourth ultrasound echo signals corresponding to the second pulse rate frequency $PRF_2$ may be received by the ultrasound probe 310. The fourth ultrasound echo signals may be the ultrasound echo signals reflected from the depth of 20 cm.

The receiving section 330 may be configured to convert the second received signals provided from the ultrasound probe 310 into second digital signals. The receiving section 330 may be further configured to apply delay to the second digital signals based on the mid-point algorithm in accordance with the embodiment to form second digital receive-focused signals.

The receive-focused delay values may be calculated by applying delay values throughout depths based on the mid-point algorithm. However, the delay values throughout the depths are not needed since a pulse wave Doppler mode or the high pulse rate frequency Doppler mode may acquire the ultrasound data by focusing a focusing point of a scan-line. Thus, the delay value corresponding to the sample volume SV is a valid delay value. When the delay value corresponding to the sample volume SV is applied to the depths, the delay value corresponding to the sample volume SV may be used as the delay value corresponding to the phantom sample volume PSV.

Figure 7:
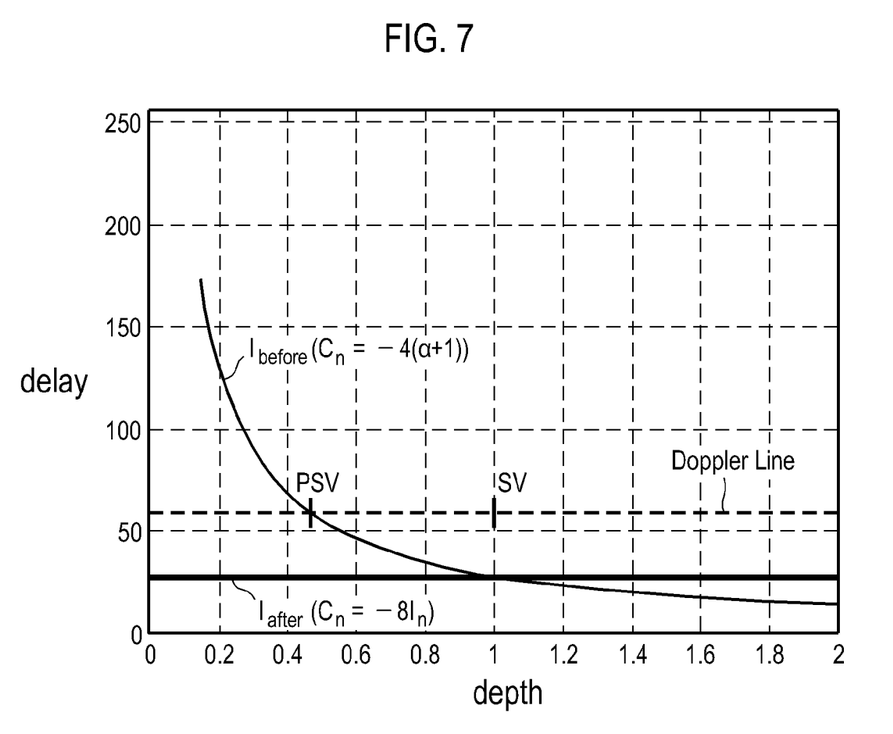
FIG. 7 is a schematic diagram showing an example of a receive-focusing delay curve.

The receiving section 330 may be configured to set an initial value of the $d_n$ in the equation 1 as 0 or under, and set an initial value of the $C_n$ in the equation 1 as $-8l_n$. When the initial values are set as mentioned above, a receive-focusing delay curve $I_{after}$, which is identically held throughout the depths, may be formed by the delay value $l_n$, as shown in FIG. 7. In FIG. 7, reference numeral $I_{before}$ represents the receiving focusing delay curve in accordance with the conventional mid-point algorithm.

Thus, the receiving section 330 may be configured to calculate a constant delay value throughout the depths by setting the $d_n$ and $C_n$ so that the initial delay values are less than 0. The receiving section 330 may be further configured to apply the calculated delay value to the digital signals to form the digital receive-focused signals.

The ultrasound data forming section 340 may be configured to form second ultrasound data corresponding to the HPRF Doppler image based on the second digital receive-focused signals provided from the receiving section 330.

Referring back to FIG. 1, the ultrasound system 100 may further include a processing unit 130 in communication with the user input unit 110 and the ultrasound data acquisition unit 120. The processing unit 130 may include a central processing unit, a microprocessor, a graphic processing unit and the like.

In the embodiment, the processing unit 130 may form the brightness mode image BI based on the first ultrasound data provided from the ultrasound data acquisition unit 120. The brightness mode image BI may be displayed on a display unit 150. Thus, a user may set the sample volume SV on the brightness mode image BI by using the user input unit 110. The processing unit 130 may further set the sample volume SV on the brightness mode image BI based on the input information (i.e., first input information) provided from the user input unit 110. The processing unit 130 may further set the phantom sample volume PSV on the brightness mode image BI based on the input information (i.e., second input information) provided from the user input unit 110. The processing unit 130 may further form Doppler signals based on the second ultrasound data provided from the ultrasound data acquisition unit 120. The processing unit 130 may further form the HPRF Doppler image based on the Doppler signals.

The ultrasound system 100 may further include a storage unit 140. The storage unit 140 may store the ultrasound data (i.e., first ultrasound data and second ultrasound data) acquired by the ultrasound data acquisition unit 120. The storage unit 140 may further store the input information received by the user input unit 110.

The ultrasound system 100 may further include the display unit 150. The display unit 150 may be configured to display the brightness mode image BI formed by the processing unit 130. The display unit 150 may be further configured to display the HPRF Doppler image formed by the processing unit 130.

Although embodiments have been described with reference to a number of illustrative embodiments thereof, it should be understood that numerous other modifications and embodiments can be devised by those skilled in the art that will fall within the spirit and scope of the principles of this disclosure. More particularly, numerous variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. An ultrasound system, comprising:
   an input interface configured to receive, from a user, a user input of setting a sample volume and a pulse rate frequency (PRF) on an ultrasound image;
   an ultrasound probe configured to transmit ultrasound signals to a living body based on the PRF, and receive ultrasound echo signals from the living body; and
   a controller configured to determine a constant delay value based on position of the sample volume by using a mid-point algorithm, form digital signals based on the ultrasound echo signals, focus the digital signals based on the constant delay value throughout depths, and form a high pulse rate frequency Doppler image of the sample volume based on the focused digital signals,
   wherein a round trip time of the ultrasound signals to the sample volume is larger than a pulse repetition period corresponding to the PRF.

2. The ultrasound system of claim 1, wherein the controller is further configured to:
   determine the constant delay value corresponding to each of a plurality of transducer elements of the ultrasound probe based on a receiving focusing delay curve which is calculated based on the mid-point algorithm.

3. A method of forming a high pulse rate frequency Doppler image, comprising:
   a) receiving a user input of setting a sample volume and a pulse rate frequency (PRF) on an ultrasound image;
   b) transmitting ultrasound signals to a living body based on the PRF, and receiving ultrasound echo signals from the living body;
   c) determining a constant delay value based on position of the sample volume by using a mid-point algorithm;
   d) forming digital signals based on the ultrasound echo signals and focusing the digital signals based on the constant delay value throughout depths; and
   e) forming a high pulse rate frequency Doppler image of the sample volume based on the focused digital signals,
   wherein a round trip time of the ultrasound signals to the sample volume is larger than a pulse repetition period corresponding to the PRF.

4. The method of claim 3, wherein the step c) comprises:
   determining the constant delay value corresponding to each of a plurality of transducer elements of the ultrasound probe based on a receiving focusing delay curve which is calculated based on the mid-point algorithm.

\* \* \* \* \*